United States Patent [19]

Okimoto et al.

[11] Patent Number: 4,641,619
[45] Date of Patent: Feb. 10, 1987

[54] FUEL INJECTION CONTROL IN SUPERCHARGED ENGINE

[75] Inventors: Haruo Okimoto; Syuzi Mithui; Hiroshi Ebino, all of Hiroshima, Japan

[73] Assignee: Mazda Motor Corporation, Hiroshima, Japan

[21] Appl. No.: 769,704

[22] Filed: Aug. 27, 1985

[30] Foreign Application Priority Data

Aug. 30, 1984 [JP] Japan ................. 59-181244

[51] Int. Cl.$^4$ .................................. F02B 3/00
[52] U.S. Cl. ........................... 123/479; 60/277
[58] Field of Search ............ 60/277, 289; 123/479, 123/494, 585, 26; 60/606

[56] References Cited

U.S. PATENT DOCUMENTS

| 4,404,805 | 9/1983 | Curtil | 60/606 |
| 4,498,429 | 2/1985 | Satow | 123/585 |
| 4,541,386 | 9/1985 | Kishi | 123/479 |

FOREIGN PATENT DOCUMENTS 55-153817 12/1980 Japan ..................... 123/26

Primary Examiner—Ronald B. Cox
Attorney, Agent, or Firm—Burns, Doane, Swecker & Mathis

[57] ABSTRACT

A fuel injection control system in an automobile engine comprising an intake system for the supply of air towards the engine and including an air flow sensor, an exhaust system for the discharge of exhaust gases, a supercharger in the intake system for compressing the air flowing towards the engine, and a secondary air supply passage extending between the intake and exhaust systems for the introducing of a portion of the compressed air into the exhaust system and including a secondary air flow sensor. During a normal operating condition, fuel is injected into the engine in a quantity dependent on the difference between the air flow detected by the air flow sensor and the secondary air flow detected by the secondary air flow sensor, but in the event of trouble occurring in the secondary air flow sensor, the fuel is injected in a quantity dependent on the air flow detected by the air flow sensor.

12 Claims, 3 Drawing Figures

FUEL INJECTION CONTROL IN SUPERCHARGED ENGINE

BACKGROUND OF THE INVENTION

The present invention relates to a system in a supercharged engine for controlling the quantity of fuel to be injected into an intake system of the engine.

It is well known to introduce a portion of the suction air, which has been compressed by a supercharger, into the exhaust system of the engine as a secondary air for the substantial purification of exhaust gases emitted from the engine. In the prior art engine system embodying this technique, the quantity of air actually introduced into the engine cylinder is of a value less the quantity of air introduced into the exhaust system, i.e., the quantity of the secondary air, and therefore, the fuel to be injected into the engine cylinder must be reduced in a quantity appropriated by the reduction in quantity of the air being introduced into the engine cylinder.

To this end, the prior art engine system such as disclosed in, for example, Japanese Laid-open Patent Publication No. 55-153817 published Dec. 1, 1980, makes use of primary and secondary air flow sensors: the primary air flow sensor is installed on the intake system downstream of the air cleaner for detecting the total flow of the air towards the engine cylinder, and the secondary air flow sensor is installed on a secondary air supply passage, connecting between the intake system and the exhaust system, for detecting the flow of the secondary air towards the exhaust system. In practice, the primary air flow sensor is constituted by an air flowmeter generally utilized in an engine system of fuel injection type, whereas the secondary air flow sensor is similar in structure to the air flowmeter. This prior art engine system also makes use of a microprocessor operable to perform a subtraction between the total air flow, detected by the primary air flow sensor, and the secondary air flow detected by the secondary air flow sensor for the determination of the actual quantity of air actually introduced into the engine cylinder and then to control the quantity of fuel to be injected in dependence on the actual quantity of the air introduced into the engine cylinder.

It has, however, been found that since the secondary air flowing through the secondary air flow sensor is a portion of the air compressed by the supercharger, and, therefore, evolves a high temperature while the pressure thereof often fluctuates, the secondary air flow sensor is placed under severe conditions and is susceptible to trouble. Once the trouble occurs in the secondary air flow sensor, the flow of the secondary air is no longer metered accurately and, as a result, no accurate control of the quantity of fuel to be injected can be achieved. In addition, when the engine is being operated under a transit condition intermediate between the conditions in which the supply of the secondary air into the exhaust system is required and is not required, respectively, the supply of the secondary air tends to become unstable to such an extent as to result in difficulty in accurate detection of the quantity of the secondary air being introduced into the exhaust system.

SUMMARY OF THE INVENTION

The present invention has therefore been developed with a view to substantially eliminating the above described disadvantages and inconveniences inherent in the prior art engine system and has for its essential object to provide an improved fuel injection control system in a supercharged engine, which is effective to properly control the quantity of fuel to be injected regardless of the occurrence of any trouble or abnormality in the secondary air flow sensor and/or the secondary air supply system.

To this end, the present invention is so devised that, in the event of trouble or abnormality in one or both of the secondary air flow sensor and the secondary air supply system, the flow of the secondary air towards the exhaust system is immediately reduced while the quantity of fuel to be injected into the engine cylinder is permitted to be controlled in dependence on the total flow of the air detected by the primary air flow sensor, not the actual flow of the air introduced into the engine cylinder which generally corresponds to the total flow of the air less the flow of the secondary air.

The basic structure of the fuel injection control system necessary to accomplish the above described object of the present invention will now be described with particular reference to FIG. 1 of the accompanying drawings.

An intake system 12 communicated with the engine cylinder 11 has a supercharger 13 and a fuel injection valve 14 installed thereon. A secondary air supply passage 16 for the introduction of the secondary air a into the exhaust passage 15 is branched from a portion of the intake system 12 downstream of the supercharger 13 with respect to the direction of flow of air towards the engine cylinder 11. The intake system 12 also has a first air flow sensor 18 installed thereon downstream of an air cleaner 17 whereas the secondary air supply passage 16 has a second air flow sensor 19 installed thereon.

A fuel control means 21 operable in response to both an output signal (total air signal) At fed from the first sensor 18 and an output signal (secondary air signal) As fed from the second sensor 19 to synthesize a fuel control signal b which corresponds to the difference between the respective output signals At and As from the first and second sensors 18 and 19, which signal b is used to drive the fuel injection valve 14 to control the quantity of fuel to be injected.

As shown, the secondary air supply passage is provided with an air flow regulator 22 for regulating the flow of the secondary air a towards the exhaust passage 15, which regulator 22 is operable in response to a command c to reduce the flow of the secondary air towards the exhaust passage 15. The command c referred to above is generated from a reducer means 24 which is activated when a detector means 23 detects the occurrence of trouble in the second sensor 19. When the detector means 23 detects the occurrence of trouble in the second sensor 19 as hereinabove described, a control modifier means 25 is also activated so that the output signal At can be regarded, for example, zero in level to permit the fuel control means 21 to control the quantity of fuel to be injected in dependence on the output signal At from the first sensor 18.

BRIEF DESCRIPTION OF THE DRAWINGS

This and other objects and features of the present invention will become clear from the following description taken in conjunction with a preferred embodiment thereof with reference to the accompanying drawings, in which.

DETAILED DESCRIPTION OF THE EMBODIMENT

Figure 1:
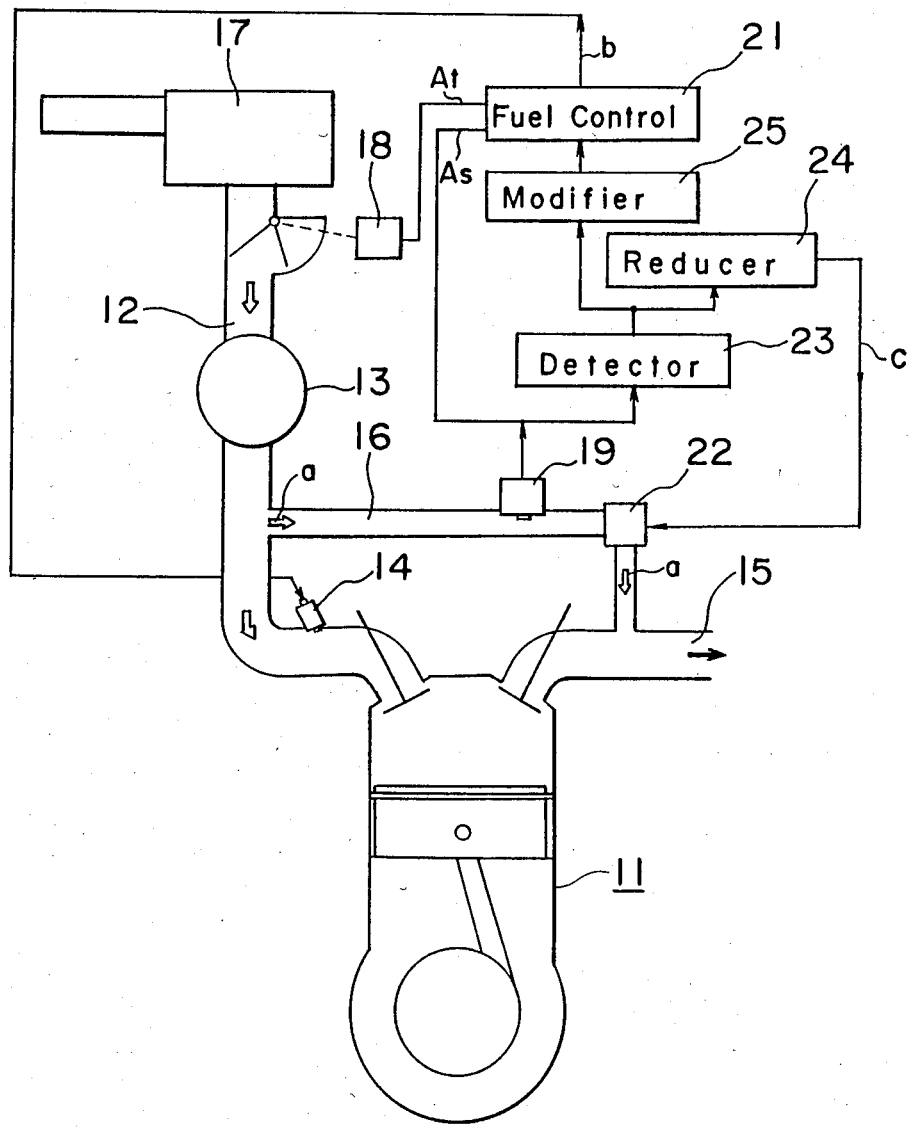
FIG. 1 is a schematic diagram showing the basic structure of the fuel injection control system of the present invention.

Before the description of the present invention proceeds, it is to be noted that like parts are designated by like reference numerals throughout the accompanying drawings.

Figure 2:
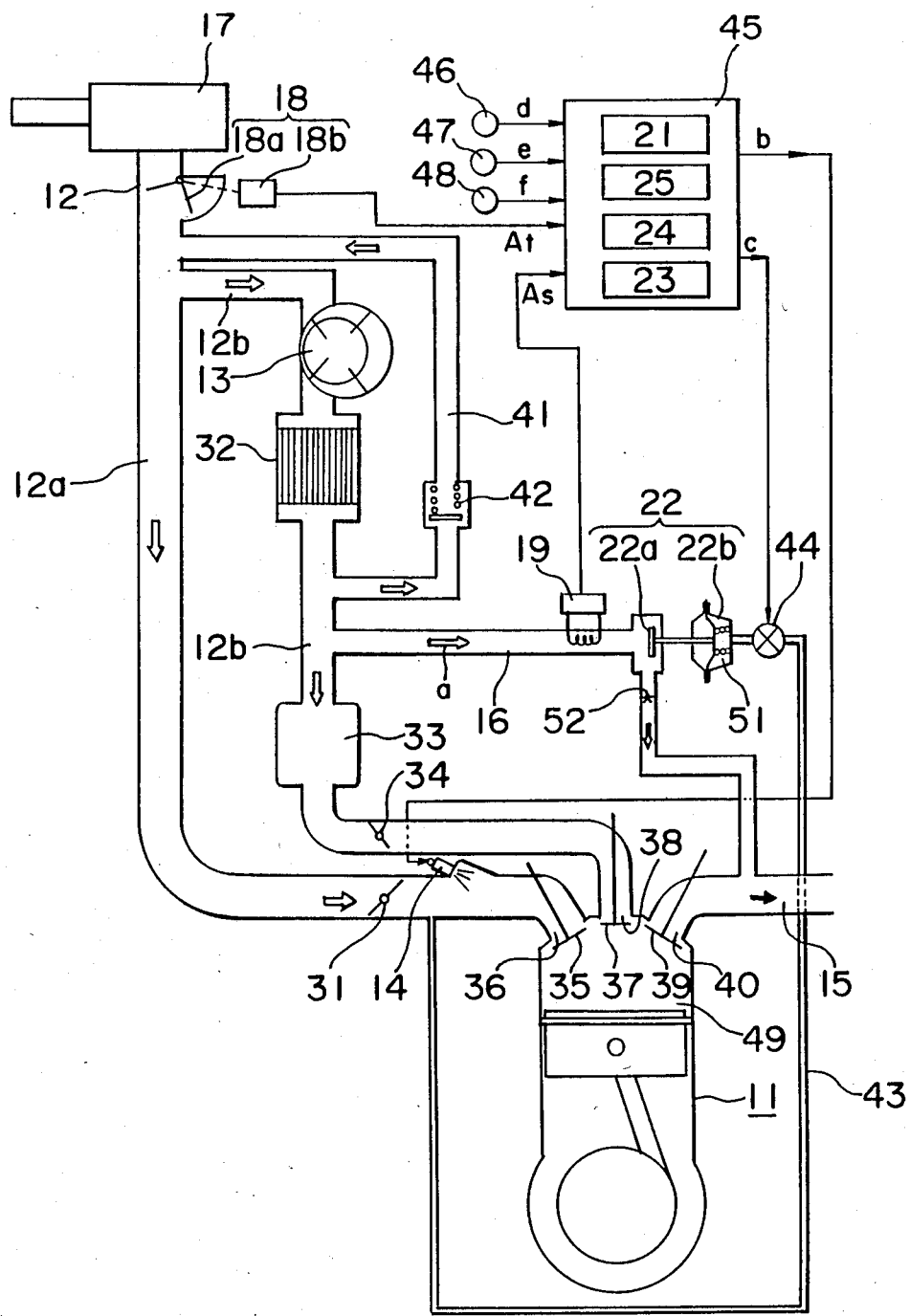
FIG. 2 is a schematic diagram showing a preferred embodiment of the present invention.

An automobile power plant shown in FIG. 2 includes a so-called "partially supercharged" internal combustion engine having the engine cylinder 11. The first air flow sensor 18 employed therein comprises a known air flowmeter 18a, disposed in the intake system 12 downstream of the air cleaner 17, and a potentiometer 18b operatively coupled with the air flowmeter 18a. At the downstream side of the first sensor 18, the intake system 12 is branched into a main intake passage 12a having the fuel injection valve 14 and a throttle valve 31 disposed therein, and an auxiliary intake passage 12b having the supercharger 13 in the form of, for example, a vane-type air pump, an inter-cooler 32, a surge tank 33 and a flow control valve 34 all disposed therein.

Referring still to FIG. 2, the engine cylinder 11 has defined therein a main intake port 36 communicated with the main intake passage 12a and adapted to be selectively closed and opened by a main intake valve 35, an auxiliary intake port 38 communicated with the auxiliary intake passage 12b and adapted to be selectively closed and opened by an auxiliary intake valve 37, and an exhaust port 40 communicated with the exhaust passage 15 and adapted to be selectively opened and closed by an exhaust valve 39, it being to be noted that the auxiliary intake port 38 is opened only at the end of the suction stroke of the engine for the admission of air into the engine cylinder 11 through the auxiliary intake passage 12b. It is also to be noted that the term "partially supercharged engine" referred to above applies to the type of engine wherein the engine cylinder has two intake ports with two parallel intake passages, one of which passages includes a supercharger, such as shown in FIG. 2.

The auxiliary intake passage 12b and the exhaust passage 15 are fluid-connected with each other through the secondary air supply passage 16 having one end communicated with a portion of the auxiliary intake passage 12b between the inter-cooler 32 and the surge tank 33, and the other end communicated with the exhaust passage 15. As hereinbefore described with reference to FIG. 1, this secondary air supply passage 16 is for the supply of that portion of the supercharged air, i.e., the secondary air a, into the exhaust passage 15 for facilitating the substantial purification of the exhaust gases emitted from the engine.

The second air flow sensor 19 employed in the secondary air supply passage 16 is in the form of, for example, a hot wire anemometer. In addition, the flow regulator 22 also employed in the supply passage 16 comprises a reciprocating valve 22a and a diaphragm valve assembly 22b for driving the reciprocating valve 22a. The supply passage 16 including the second sensor 19 and the flow regulator 22 also includes a check valve 52 disposed therein downstream of the reciprocating valve 22a with respect to the direction of flow of the secondary air a towards the exhaust passage 15. The diaphragm valve assembly 22b is fluid-connected with the main intake passage 12a through a negative pressure introducing passage 43 having a three-way electromagnetic valve 44 operable to selectively interrupting and permitting the introduction of a negative pressure inside the main intake passage 12a to a working chamber 51 of the diaphragm valve assembly 22b.

It is to be noted that, since the secondary air a flowing through the second sensor 19 is a portion of the air supercharged by the supercharger 13, it evolves a high temperature and that the secondary air a flows through the supply passage 16 under varying pressure attributable to the operating characteristic of the supercharger 13. Therefore, it is evident that the second sensor 19 is exposed to severe conditions and is susceptible to trouble.

The intake system 12 also includes a relief passage 41 extending from a portion of the auxiliary intake passage 12b downstream of the inter-cooler 32 to the intake system 12 and having a pressure relief valve 42 disposed therein for avoiding any possible development of the excessively supercharged pressure.

Reference numeral 45 represents a microcomputer. This microcomputer 45 has built therein the fuel control means 21, the abnormality detector means 23, the reducer means 24 and the control modifier means 25 all being shown in and described with reference to FIG. 1. Not only are the output signals At and As from the first and second sensors 18 and 19, respectively, applied to the microcomputer 45, but the latter also receives an engine speed signal d indicative of the engine speed detected by a speed sensor 46, a throttle signal 3 indicative of the throttle opening detected by a throttle sensor 47, and a temperature signal f indicative of the temperature of the engine detected by an engine temperature sensor 48.

Figure 3:
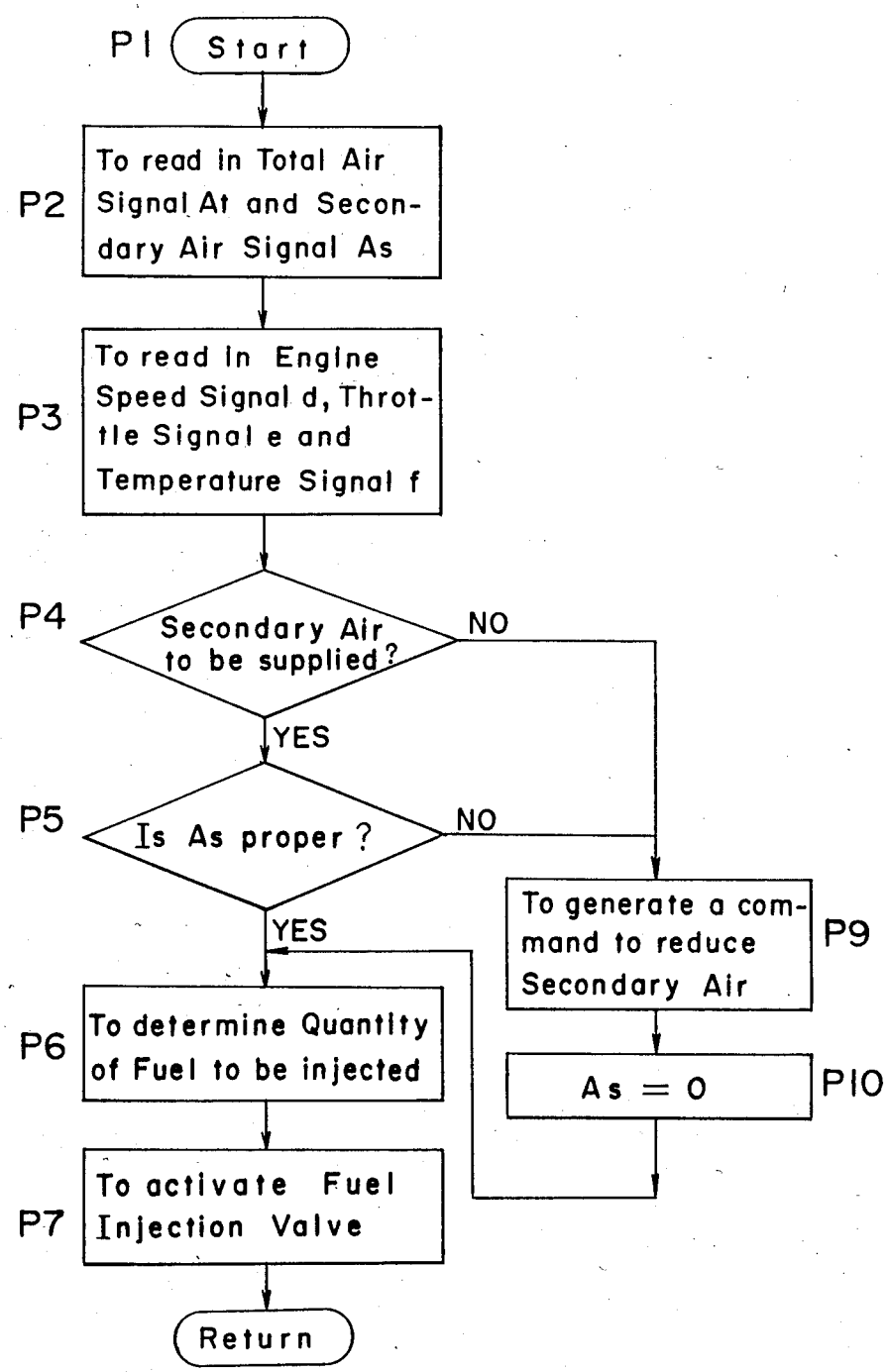
FIG. 3 is a flowchart showing the sequence of operation of the fuel injection control system shown in FIG. 2.

The control operation performed by the microcomputer 45 will now be described with particular reference to the flowchart shown in FIG. 3.

Subsequent to the start at step P1, the microcomputer 45 reads in both the total air signal At and the secondary air signal As at step P2 and, then, all of the engine speed signal d, the throttle signal e and the temperature signal f at step P3. Thereafter, a decision is made at step P4 to determine if the engine is operating under a condition which requires the supply of the secondary air into the exhaust passage 15. The engine operating condition in which the supply of the secondary air into the exhaust passage 15 is required is regarded as established when any one of the engine speed and the throttle opening represented respectively by the engine speed signal d and the throttle signal e falls within a predetermined range of values that are mapped in a map. Therefore, the decision at step P4 is made with reference to the map. Thus, if the result of decision at step P4 indicates that the engine is operating under the condition requiring the supply of the secondary air to the exhaust passage 15, another decision is made at step P5 to determine if the secondary air signal As is of a proper value, wherefor the occurrence of trouble in the second sensor 19 and/or the surging of the valve 22a can be detected. If the secondary air signal As deviates from a predetermined range of values, the secondary air signal As is judged improper, but if it is within the predetermined range of values, it is judged proper. This decision is done by the abnormality detector means 23, and only when the secondary air signal As is determined improper, indication is made of the occurrence of trouble in the second sensor 19 and/or the surging of the valve 22a. Unless the result of decision at step P5 indicates that the secondary air signal As is of the improper value, the program flow proceeds to the next succeeding step P6.

At step P6, by the utilization of the data derived from the total air signal At, the secondary air signal As, the engine speed signal d, the throttle signal e and the temperature signal f, the quantity of fuel to be injected into the engine cylinder 11 is calculated and, as a result of the calculation, a fuel control signal b is generated to the fuel injection valve 16 to drive the latter thereby controlling the quantity of fuel being injected. Both the calculation of the fuel quantity and the generation of the fuel control signal b are performed by the fuel control means 21.

It is to be noted that the quantity of fuel to be injected is generally proportional to the amount of air actually sucked into a combustion chamber 49 in the engine cylinder 11, which amount is represented by a signal An equal to the total air signal At less the secondary air signal As. Accordingly, the fuel control means 21 built in the microcomputer 45 determines the fuel quantity by calculating the amount of air actually sucked into the combustion chamber 49 according to the equation of (AnAt-As) and then effecting a correction to the result of the calculation according to the intelligence derived by the signals d, e and f. At the subsequent step P7, the fuel injection valve 14 is driven in response to the fuel control signal b to inject the fuel.

Where the result of decision at step P4 indicates that the engine is bieng operated under a condition other than the condition requiring the supply of the secondary air, the step P4 is followed by step P9 at which a command c necessary to reduce the flow of the secondary air through the passage 16 is generated to the three-way electromagnetic valve 44. In response to this command c, the three-way valve 44 is brought in position to permit the working chamber 51 of the diaphragm valve assembly 22b to be commmunicated with the atmosphere to move the valve 22a towards a closed position (in a direction leftwards as viewed in FIG. 2) for closing the secondary air supply passage 16 thereby to interrupt the supply of the secondary air into the exhaust passage 15. The command c referred to above is identical with a signal which is generated as will be described later in the event of the detection of occurrence of an abnormality and is outputted from the reducer means 24 when the latter is activated by, for example, a secondary air supply zone determining means (not shown) built in the microcomputer 45 for the determination of the engine operating condition requiring the supply of the secondary air.

Step P9 is followed by step P10 at which the secondary air signal As is zeroed, followed in turn by the determination of the fuel quantity at step P6. The reason that the secondary air signal As is zeroed at step P10 is for the purpose of avoiding any possible occurrence of an error in calculation of the fuel quantity, performed at step P6, even though the signal As of zero value is outputted as a result of an erroneous operation of the first sensor 18 by some reason.

On the other hand, where the result of decision at step P5 indicates that the secondary air signal is improper, that is, in the event that the trouble occurring in the second sensor 19 is detected by the abnormality detector means 23 and/or the surging takes place in the valve 22a, the command c is generated at step P9 from the reducer means 24 to eventually interrupt the supply of the secondary air a in the manner as hereinabove described.

Subsequently, and at step P10, the secondary air signal As is zeroed, followed by step P6 at which the fuel control means 21 calculates the fuel quantity according to the equation An=At−As=At (As=0). The zeroing of the secondary air signal As at step P10 is carried out by the control modifier means 25. Thus, since the calculation of the fuel quantity is carried out in dependence on the total air signal At while the secondary air signal As is determined zero, the quantity of fuel to be injected can be properly determined at all times even if the second sensor 19 generates an erroneous output signal As because of trouble occurring in the second sensor 19 and/or the occurrence of the surging of the valve 22a.

Thereafter, the program flow returns at step P8 to step P1 to repeat it.

Although the present invention has fully been described in connection with the preferred embodiment thereof with reference to the accompanying drawings, it is to be noted that various changes and modifications are apparent to those skilled in the art. By way of example, although the flow regulator 22 has been described as used to cause the valve 22a to close the passage 16, i.e., to interrupt the flow of the secondary air a through the passage 16, it may be so designed as to drastically decrease the flow of the secondary air a. In this alternative case, it may happen that the secondary air signal As is judged zero at step P10 even though the flow of the secondary air a actually flowing past the flow regulator 22 is not zero. However, if the flow of the secondary air after it has been drastically reduced is controlled to a small value, any error which will incidentally occur in the calculation of the fuel quantity at step P6 can be practically negligible.

Accordingly, such changes and modification are to be understood as included within the scope of the present invention as defined by the appended claims unless they depart therefrom.

What is claimed is:

1. A fuel injection control system in a supercharged engine, which comprises, in combination:
   an intake system for the supply of suction air to at least one combustion chamber of the engine and including an air cleaner;
   an exhaust system for the discharge of exhaust gases from the combustion chamber;
   a first air flow sensor means disposed in the intake system downstream of the air cleaner for detecting the flow of the suction air entering the intake system through the air cleaner;
   a supercharger disposed in the intake system downstream of the first air flow sensor means for providing the combustion chamber with a supercharged air;
   a secondary air supply passage extending from a portion of the intake system downstream of the supercharger to the exhaust system for supplying a portion of the supercharged air to the exhaust system;
   a second air flow sensor means disposed in the secondary air supply passage for detecting the flow of the air towards the exhaust system;
   a fuel control means operable in response to respective outputs from the first and second sensor means to detect the total flow of the suction air and the flow of secondary air flowing through the supply passage and to control the quantity of fuel to be injected, which fuel quantity corresponds to the difference between the total flow of the suction air and the flow of the secondary air;

an abnormality signal detecting means for detecting the generation by the second sensor means of a signal of a value deviating from a predetermined range of values;

a reducing means for controlling the flow of the secondary air so as to decrease it in the event that the detecting means detects the occurrence of an abnormality; and a control modifying means for, in the event of the abnormality, modifying the fuel control means so as to control the quantity of fuel to be injected solely in dependence on the output from the first sensor means.

2. A system as claimed in claim 1, wherein the reducing means includes a flow control valve disposed in the supply passage for controlling the flow of the secondary air through the supply passage.

3. A system as claimed in claim 2, wherein the flow control valve is disposed in the supply passage downstream of the second sensor means.

4. A system as claimed in claim 3, wherein the reducing means interrupts the flow of the secondary air in the event of the abnormality.

5. A system as claimed in claim 4, further comprising a check valve disposed in the supply passage downstream of the flow control valve for avoiding a reverse flow of the exhaust gases from the exhaust system towards the intake system.

6. A system as claimed in claim 3, wherein the reducing means controls the flow of the secondary air to a value smaller than a predetermined value in the event of the abnormality.

7. A system as claimed in claim 1, wherein the reducing means interrupts the flow of the secondary air in the event of the abnormality.

8. A system as claimed in claim 1, wherein the reducing means controls the flow of the secondary air to a value smaller than a predetermined value in the event of the abnormality.

9. A system as claimed in claim 1, wherein the intake system is branched at a location downstream of the first sensor means into first and second intake passages both fluid-connected with the combustion chamber, and wherein the supercharger is disposed in one of the first and second intake passages.

10. A system as claimed in claim 9, wherein the reducing means interrupts the flow of the secondary air in the event of the abnormality.

11. A system as claimed in claim 10, wherein the second sensor means comprises a hot wire anemometer.

12. A system as claimed in claim 11, wherein the supercharger comprises a vane-type air pump.

* * * * *